United States Patent
Konno et al.

(10) Patent No.: US 11,338,780 B2
(45) Date of Patent: May 24, 2022

(54) BRAKING SYSTEM

(71) Applicant: TOYOTA JIDOSHA KABUSHIKI KAISHA, Toyota (JP)

(72) Inventors: Ikuru Konno, Toyoake (JP); Tetsuya Fujimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 16/832,612

(22) Filed: Mar. 27, 2020

(65) Prior Publication Data
US 2020/0317170 A1   Oct. 8, 2020

(30) Foreign Application Priority Data

Apr. 3, 2019   (JP) .............................. JP2019-071273

(51) Int. Cl.
*B60T 7/10* (2006.01)
*B60T 7/12* (2006.01)
*B60T 13/62* (2006.01)

(52) U.S. Cl.
CPC ................ *B60T 7/12* (2013.01); *B60T 13/62* (2013.01); *B60T 2270/402* (2013.01)

(58) Field of Classification Search
CPC ........ Y10S 254/05; B60T 7/105; B60T 7/107; B60T 7/16; B60T 7/12; B60T 13/746
See application file for complete search history.

(56) References Cited

U.S. PATENT DOCUMENTS

| | | | | |
|---|---|---|---|---|
| 1,790,851 A | * | 2/1931 | Weaver | B60T 17/223 92/15 |
| 1,907,835 A | * | 5/1933 | Langbein | B60T 17/223 73/132 |
| 1,950,640 A | * | 3/1934 | Wickliffe | B60S 5/00 254/93 R |
| 2,177,469 A | * | 10/1939 | White | B60T 17/223 303/7 |
| 2,711,228 A | * | 6/1955 | Shank | B60T 17/223 303/7 |
| 3,888,552 A | * | 6/1975 | Fontaine | B60T 7/16 303/84.1 |

(Continued)

FOREIGN PATENT DOCUMENTS

| | | |
|---|---|---|
| CN | 104760586 A | 7/2015 |
| JP | 2014-024514 A | 2/2014 |

(Continued)

*Primary Examiner* — Robert A. Siconolfi
*Assistant Examiner* — Stephen M Bowes
(74) *Attorney, Agent, or Firm* — Sughrue Mion, PLLC

(57) ABSTRACT

A braking system is provided. The braking system includes a plurality of brake fluid pressure generation devices provided in a front-side storage camber of a vehicle in which automated driving is enabled. The brake fluid pressure generation devices are provided on the same fluid pressure transmission route and include a non-electrically actuated brake pedal unit. The braking system includes an emergency stop button provided in a vehicle cabin, and an emergency brake circuit that generates braking force with use of the brake pedal unit in a non-energized state or in a case of transition to the non-energized state after the emergency stop button is operated.

7 Claims, 11 Drawing Sheets

(56) References Cited

U.S. PATENT DOCUMENTS

| | | | | |
|---|---|---|---|---|
| 5,031,729 | A * | 7/1991 | Wittkop | B60T 17/223 |
| | | | | 188/3 H |
| 9,494,940 | B1 * | 11/2016 | Kentley | B60W 10/04 |
| 2003/0192751 | A1 * | 10/2003 | Costa | B60T 13/683 |
| | | | | 188/170 |
| 2004/0160117 | A1 * | 8/2004 | Brock | B60T 13/141 |
| | | | | 303/20 |
| 2013/0284015 | A1 * | 10/2013 | Menten | B60T 17/222 |
| | | | | 92/145 |
| 2016/0121869 | A1 * | 5/2016 | Cann | B60T 7/042 |
| | | | | 188/156 |

FOREIGN PATENT DOCUMENTS

| | | |
|---|---|---|
| JP | 2018-114940 A | 7/2018 |
| JP | 2018-131042 A | 8/2018 |

\* cited by examiner

BRAKING SYSTEM

INCORPORATION BY REFERENCE

The disclosure of Japanese Patent Application No. 2019-071273 filed on Apr. 3, 2019 including the specification, drawings and abstract is incorporated herein by reference in its entirety.

BACKGROUND

1. Technical Field

The present disclosure relates to a braking system, especially to a braking system provided in a vehicle in which automated driving is enabled.

2. Description of Related Art

A vehicle in which automated driving is enabled so that the vehicle is automatically controlled and driven (hereinafter, also referred to as a self-driving vehicle) has been known.

For example, Japanese Unexamined Patent Application Publication No. 2018-131042 (JP 2018-131042 A) discloses a vehicle motion control system having an automated driving control unit and a vehicle motion control unit. In the vehicle motion control system, when abnormality is detected in an electrically-driven intelligent brake, an electrical parking brake or a VDC unit is selected instead of the electrically-driven intelligent brake.

SUMMARY

In a self-driving vehicle, control is mainly focused, and, for equipment and so on that are controlled, those for a conventional vehicle (hereinafter, also referred to as a manual driving vehicle) are often diverted.

Therefore, a type of a parking brake that is often used in the manual driving vehicle can be applied to a self-driving vehicle. In this type of parking brake, drum brakes operated by a wire cable cramp rear wheels. However, there is a problem that retaining force is insufficient in comparison with a brake that cramps all four wheels. Therefore, it is possible to consider that a parking brake that cramps all four wheels is applied. However, there is a problem that the number of components, a weight of a vehicle body, and manufacturing cost are increased.

Meanwhile, when an electrical parking brake is employed like the one that is disclosed in JP 2018-131042 A described above, an entire braking system may have a malfunction when an abnormality happens to the electrical parking brake.

Moreover, in the self-driving vehicle, there are instances where an auxiliary brake that supports a main brake, and an emergency stop brake that is able to operate even when a vehicle has power outage are required. However, when the main brake, the auxiliary brake, the parking brake, and the emergency stop brake are provided, a configuration becomes complex, and the number of components, a weight of the vehicle body, and manufacturing cost may increase.

The present disclosure has been accomplished in consideration of these problems, and an object thereof is to provide a technology that realizes a parking brake that generates high retaining force with a simple configuration in a braking system provided in a vehicle in which automated driving is enabled.

In order to attain the above-mentioned object, in a braking system according to the present disclosure, a non-electrically actuated brake fluid pressure generation device that is able to operate as an emergency stop brake is also operated as a substitute for a parking brake.

Specifically, the present disclosure is applied to a braking system in a vehicle in which automated driving is enabled. The braking system includes a plurality of brake fluid pressure generation devices that are provided in a storage chamber divided from a vehicle cabin. Each of the brake fluid pressure generation devices generates brake fluid pressure.

In the foregoing braking system, the brake fluid pressure generation devices are provided on the same fluid pressure transmission route on which the brake fluid pressure is transmitted, and include a non-electrically actuated brake fluid pressure generation device. The braking system includes an emergency stop brake operating unit and a brake circuit. The emergency stop brake operating unit is provided inside the vehicle cabin and is configured to actuate the brake fluid pressure generation devices independently from the automated driving. The brake circuit is configured to generate braking force with use of the brake fluid pressure from the non-electrically actuated brake fluid pressure generation device in a non-energized state or in a case of transition to the non-energized state after the emergency stop brake operating unit is operated.

In the present disclosure, the "automated driving" is a concept that includes not only fully-automated driving that does not need any operation by an occupant at all, but also semi-automated driving in which the occupant performs auxiliary operations.

With this configuration, when (1) the brake circuit is in the non-energized state such as when the vehicle has power outage, the non-electrically actuated brake fluid pressure generation device functions as the emergency stop brake. Therefore, it is possible to achieve fail safe.

Further, when (2) the brake circuit is transitioned from the energized state to the non-energized state after the emergency stop brake operating unit is operated, such as when the occupant turns off a power source of the vehicle after operating the emergency stop brake operating unit in parking the vehicle, the non-electrically actuated brake fluid pressure generation device functions as a parking brake. In such an occasion, since the brake fluid pressure generation devices are provided on the same fluid pressure transmission route, it is possible to cramp all wheels with brake fluid pressure from the non-electrically actuated brake fluid pressure generation device.

As described above, in the present disclosure, as the non-electrically actuated brake fluid pressure generation device has a function as the emergency stop brake and a function as the parking brake, it is possible to realize the parking brake generating high retaining force with a simple configuration.

In the foregoing configuration, if the vehicle has power outage, the non-electrically actuated brake fluid pressure generation device functions as the emergency stop brake. However, when the brake circuit remains in the non-energized state, a locked state of the wheels continues. Therefore, in a case where a breakdown vehicle is moved by a wrecker or the like, it is necessary to unlock the wheels.

Therefore, in the braking system, the brake circuit may be configured so that an external power source is connected with the brake circuit. Thus, even in the non-energized state, the brake circuit is able to release braking force generated by the non-electrically actuated brake fluid pressure generation device. The brake circuit may be provided with an external power source connector.

With the above configuration, it is possible to release the braking force generated by the non-electrically actuated brake fluid pressure generation device by a simple operation that the external power source is connected with the external power source connector provided in the brake circuit. Therefore, it is possible to move the breakdown vehicle easily.

Further, in the braking system, the brake circuit may be configured such that a solenoid and an internal power source are electrically connected with each other in series. The solenoid is configured to prohibit actuation of the non-electrically actuated brake fluid pressure generation device when a current flows. As the emergency stop brake operating unit is operated, the emergency stop brake operating unit may cut off the current between the solenoid and the internal power source. The external power source connector may be a junction box that is electrically connected with the solenoid in parallel so that a current from the external power source is allowed to flow in the solenoid.

With this configuration, when the emergency stop brake operating unit is operated, the current is cut off, the solenoid stops prohibiting actuation of the non-electrically actuated brake fluid pressure generation device, and the non-electrically actuated brake fluid pressure generation device is actuated. Thus, it is possible to realize the forgoing emergency stop brake easily.

Moreover, even if the vehicle has power outage, as the external power source is connected with the junction box, the current is allowed to flow in the solenoid, and actuation of the non-electrically actuated brake fluid pressure generation device is prohibited. Therefore, it is possible to easily realize unlocking of the wheels.

Furthermore, in the foregoing braking system, the brake fluid pressure generation devices may include an electrically actuated brake fluid pressure generation device that includes a cylinder and a piston configured to slide inside the cylinder, and the electrically actuated brake fluid pressure generation device may be configured to generate brake fluid pressure in accordance with a stroke of the piston. The non-electrically actuated brake fluid pressure generation device may include an air cylinder, and a brake pedal stored in the storage chamber. The air cylinder is configured to be actuated as the emergency stop brake operating unit is operated, and the brake pedal is configured to be pushed into the air cylinder and to cause the piston to produce the stroke.

With this configuration, because the brake pedal generates brake fluid pressure by causing the piston to produce the stroke, the electrically actuated brake fluid pressure generation device is able to share components with a conventional brake fluid pressure generation device (a master cylinder) except the air cylinder that is used instead of stepping force of the driver. Moreover, since the brake pedal is stored in the storage chamber, it is possible to use a wider space for the vehicle cabin.

As described so far, with the braking system according to the present disclosure, it is possible to realize the parking brake that generates high retaining force with a simple configuration.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure are described based on the drawings.

Overall Configuration of Vehicle

Figure 1:
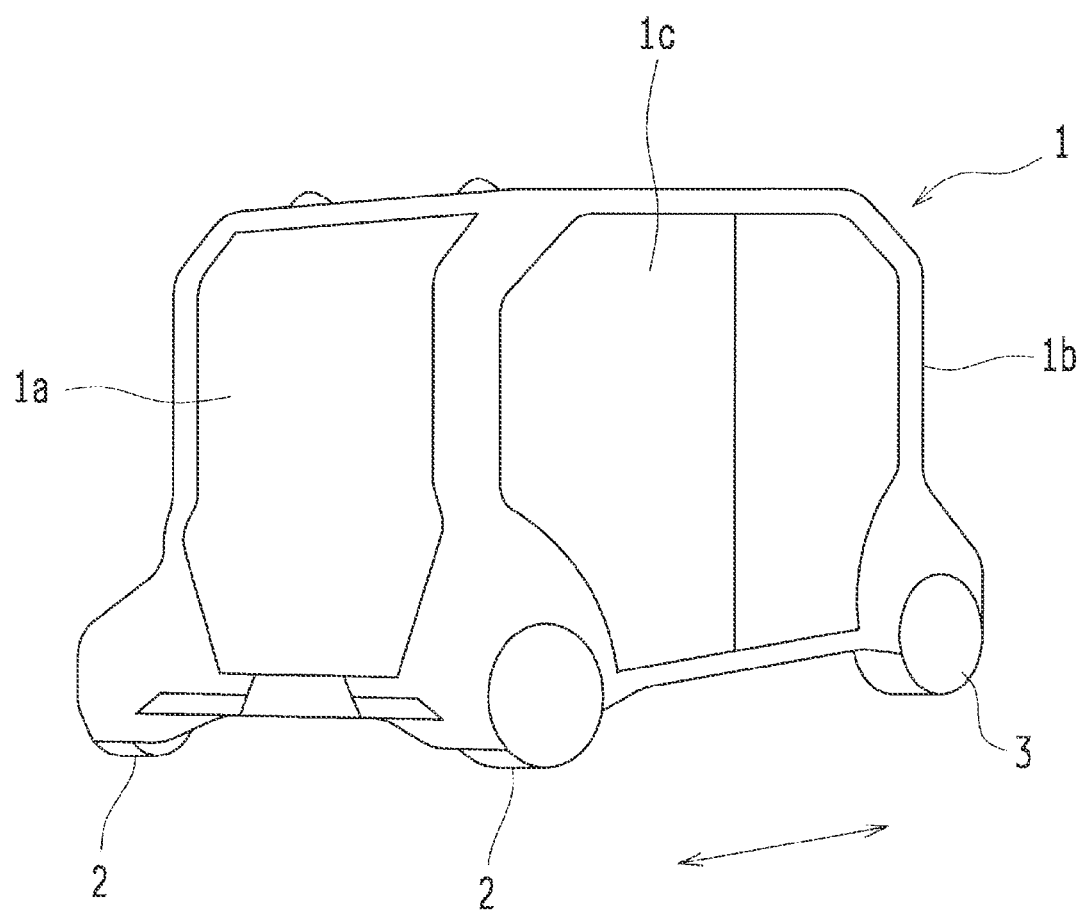
FIG. 1 is a schematic perspective view of a vehicle according to an embodiment of the present disclosure.

FIG. 1 is a schematic perspective view of a vehicle 1 according to an embodiment. As shown in FIG. 1, the vehicle 1 has an external appearance that is greatly different from conventional general vehicles in that, for example, its vehicle body is almost symmetrical in an advancing direction (see an arrow in FIG. 1), wheels 2, 3 are arranged extremely close to both ends of the vehicle, respectively, there is no hood or the like that covers an engine compartment (a motor room), an almost entire surface of a vehicle side surface 1c is configured as a doorway.

Since the vehicle 1 is able to advance to both sides in the advancing direction in the almost same mode, there is no concept of a front side and a rear side in the vehicle 1. However, for convenience, a left side in FIG. 1 is described as a front end portion 1a (reference numerals 2 represent front wheels), and a right side in FIG. 1 is described as a rear end portion 1b (reference numerals 3 represent rear wheels). Further, in each of the drawings, an arrow Fr represents a front side in a vehicle front-rear direction, an arrow Rh represents a right side in a vehicle width direction, and an arrow Up represents an upper side.

Figure 2:
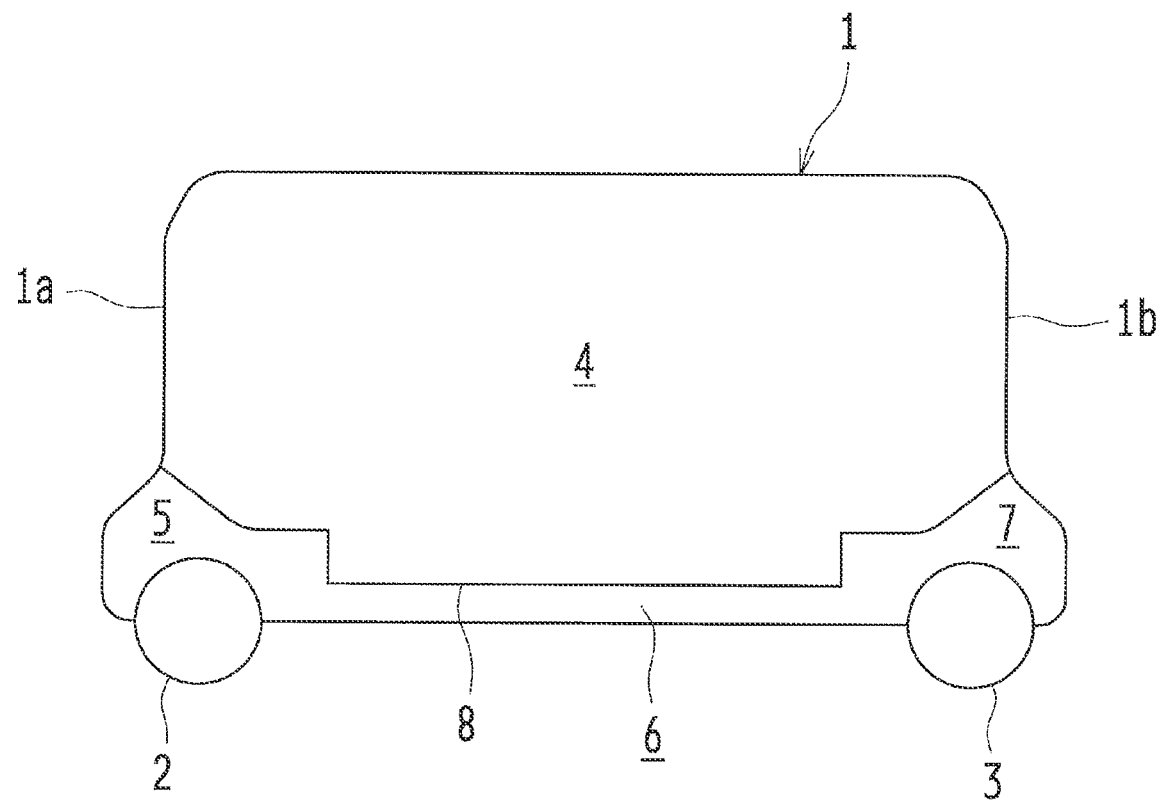
FIG. 2 is a schematic vertical sectional view of an inside of the vehicle.

FIG. 2 is a schematic vertical sectional view of an inside of the vehicle 1. In FIG. 2, seats and so on are not shown. In the vehicle 1, so-called "automated driving" is enabled. Accordingly, not only the external appearance, but also the inside of the vehicle 1 are greatly different from conventional general vehicles as shown in FIG. 2. The "automated driving" is a concept that includes not only fully-automated driving in which an operation by an occupant is not necessary at all, but also semi-automated driving in which an occupant performs auxiliary operations.

For example, in the vehicle 1, an ECU 50 (see FIG. 4) actuates an electric drive motor 51 (see FIG. 3), a steering actuator (not shown), a brake actuator 20 (see FIG. 3), and so on based on information from a camera, a sensor, a radar, a GPS antenna, and so on (not shown), commands transmitted from an external server through a network, and so on. Thus, the automated driving is performed.

Therefore, in the vehicle 1, presence of a so-called "driver" is not essential, and, as shown in FIG. 2, an operation part for the driver such as a steering wheel and a brake pedal is not permanently provided inside a vehicle cabin 4. Therefore, a proportion of the vehicle cabin 4 in the entire vehicle 1 is very large. The state in which "the operation part is not permanently provided in the vehicle cabin 4" includes not only a case where the operation part is not provided at all in the vehicle 1 itself, but also a case where the operation part that is normally hidden in storage chambers 5,7 or an underfloor space 6 appears in the vehicle cabin 4 as a result of, for example, a button operation and so on when an unexpected situation occurs.

As a matter of course, the vehicle 1 is configured so that not only the fully-automated driving by the ECU 50 and so on, but also the semi-automated driving are possible. In the semi-automated driving, an operator serving as a monitoring person who is in the vehicle cabin 4 performs an auxiliary operation. A system of the vehicle 1 is configured so that, for example, the operator is able to monitor situations around the vehicle 1 as a periphery image captured by the camera is projected on a tablet PC (not shown) owned by the operator, and that the operator is able to actuate the emergency stop brake or the like by pressing a button icon on an image on the tablet PC.

Presence of the operator in the vehicle cabin 4 is not essential, and an operator and so on in an external management center or the external server may play a role of the operator inside the vehicle cabin 4.

Further, as shown in FIG. 2, in the vehicle 1, the front-side and rear-side storage chambers 5, 7 are formed in the front end portion 1a and a rear end portion 1b of the vehicle 1, respectively, so that the front-side and rear-side storage chambers 5, 7 overlap a part of the vehicle cabin 4 in the vehicle front-rear direction. In the front-side and rear-side storage chambers 5, 7, drive system apparatuses and electric system apparatuses such as the ECU 50, the electric drive motor 51, the steering actuator, the brake actuator 20, and so on are stored. Specifically, the front-side and rear-side storage chambers 5, 7 are divided from the vehicle cabin 4 by frame members such as side rails 65 (see FIG. 9) and a crossmember 63 (see FIG. 9) described later, and panel members (hereinafter, also referred to as frame members or the like 8) of a cabin that configures the vehicle cabin 4. Thus, in the vehicle 1, upper spaces of the front-side and rear-side storage chambers 5, 7 can be used as the vehicle cabin 4.

As described above, in the vehicle 1 according to the embodiment, the vehicle 1 being largely different from conventional general vehicles, configurations, structures, and arrangement of various pieces of onboard equipment are elaborated. Thus, as described above, the vehicle 1 is realized in which a proportion of the vehicle cabin 4 in the entire vehicle 1 is very high (proportions of the front-side and rear-side storage chambers 5, 7, and so on, that store the onboard equipment are very low). Hereinafter, a functional configuration, a structure, arrangement, and so on of a braking device 10 in the braking system are described in detail as a part of factors of realizing the relatively wide vehicle cabin 4 described above.

Braking Device—Arrangement of Braking Device

Figure 3:
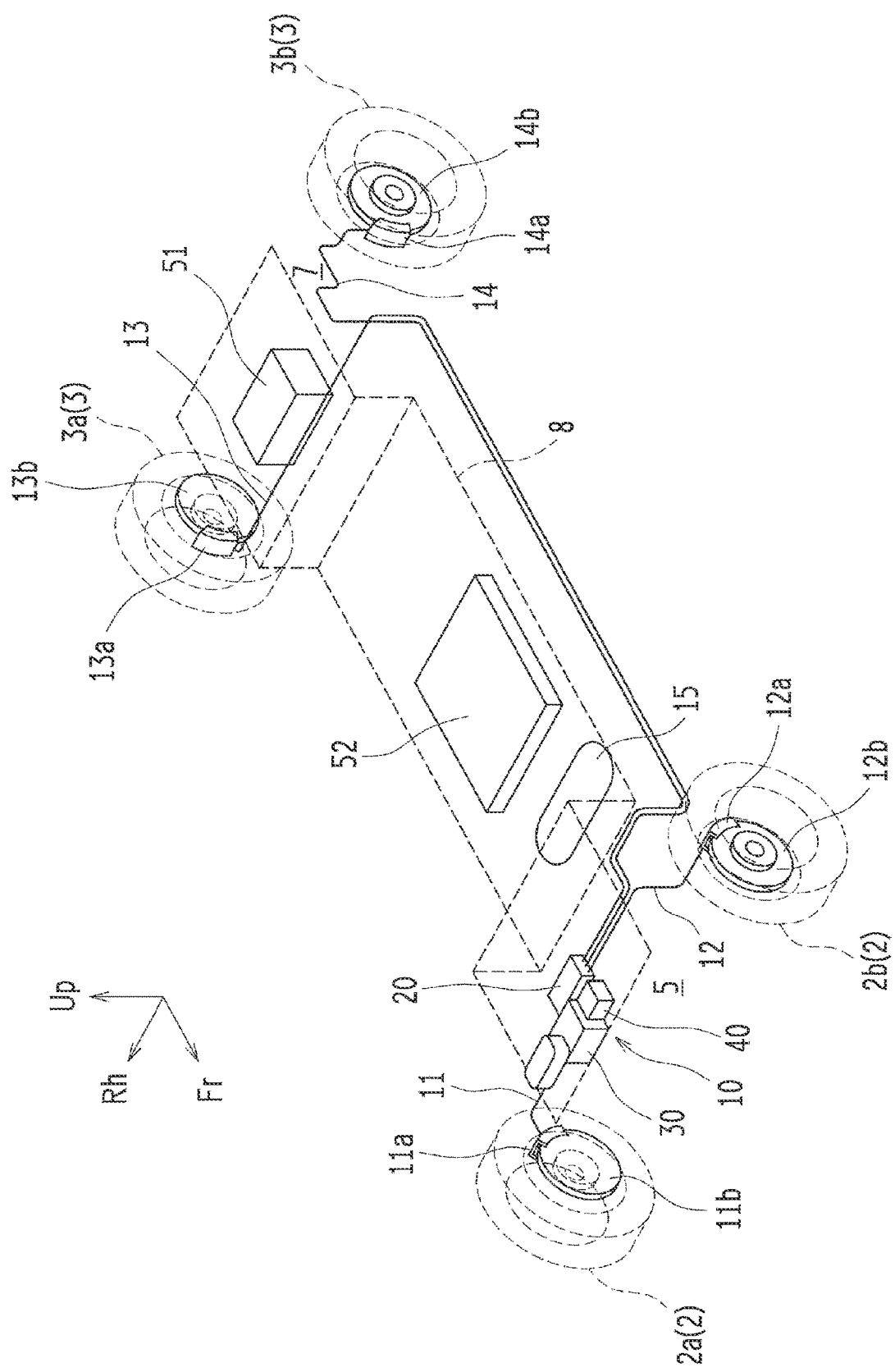
FIG. 3 is a schematic perspective view of a braking device.

FIG. 3 is a schematic perspective view of the braking device 10. As shown in FIG. 3, the braking device 10 includes the brake actuator 20, a brake unit 30, a brake pedal unit 40, an air tank 15, first to fourth brake pipes 11, 12, 13, 14, first to fourth brake calipers 11a, 12a, 13a, 14a, and first to fourth brake discs 11b, 12b, 13b, 14b.

In the braking device 10, the brake actuator 20, the brake unit 30, and the brake pedal unit 40 that function as brake fluid pressure generation devices generating brake fluid pressure are arranged inside the front-side storage chamber 5. The electric drive motor 51 that is a driving source of the vehicle 1 is arranged inside the rear-side storage chamber 7 located on the opposite side from the brake actuator 20, the brake unit 30, and the brake pedal unit 40.

The brake actuator 20 and the brake unit 30 are electrically actuated and generate brake fluid pressure in electric motors 26, 36 (see FIG. 5), respectively. The brake actuator 20 and the brake unit 30 are configured so as to be actuated with use of a battery 52 as a power source, the battery 52 being arranged in the underfloor space 6 in a center part of the vehicle 1. Meanwhile, the brake pedal unit 40 is pneumatically actuated, and is configured so as to be actuated with use of compressed air filled in the air tank 15 arranged in the underfloor space 6.

The first brake caliper 11a and the first brake disc 11b are provided in a right front wheel 2a. The first brake caliper 11a is connected with a first port 23a (see FIG. 4) of the brake actuator 20 through the first brake pipe 11 extending to the right side in the vehicle width direction within the front-side storage chamber 5. Also, the second brake caliper 12a and the second brake disc 12b are provided in a left front wheel 2b. The second brake caliper 12a is connected with a second port 23b (see FIG. 4) of the brake actuator 20 through the second brake pipe 12 extending to the left side in the vehicle width direction within the front-side storage chamber 5.

The third brake caliper 13a and the third brake disc 13b are provided in a right rear wheel 3a. The third brake caliper 13a is connected with a third port 24a (see FIG. 4) of the brake actuator 20 through the third brake pipe 13. The third brake pipe 13 first extends to the left side in the vehicle width direction within the front-side storage chamber 5, then extends to the rear side in the vehicle front-rear direction in the underfloor space 6 and reaches the rear-side storage chamber 7. Then, the third brake pipe 13 extends to the right side in the vehicle width direction within the rear-side storage chamber 7. Further, the fourth brake caliper 14a and the fourth brake disc 14b are provided in a left rear wheel 3b. The fourth brake caliper 14a is connected with a fourth port 24b (see FIG. 4) of the brake actuator 20 through the fourth brake pipe 14 that reaches the rear-side storage chamber 7 similarly to the third brake pipe 13, and then extends to the left side in the vehicle width direction within the rear-side storage chamber 7.

Brake Fluid Pressure Transmission Route

Figure 4:
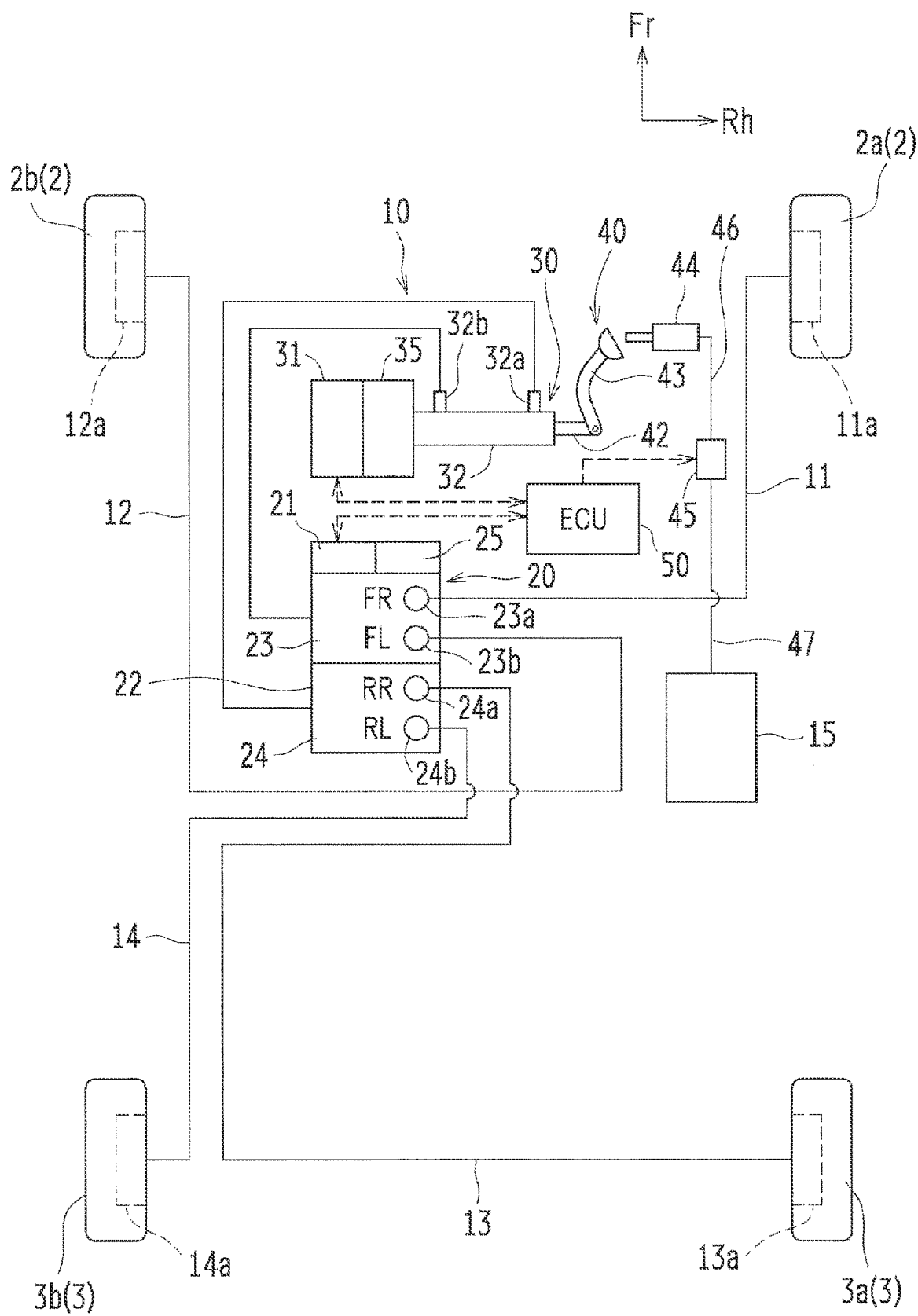
FIG. 4 is a schematic view describing a brake fluid pressure transmission route.

FIG. 4 is a view schematically describing a brake fluid pressure transmission route. As shown in FIG. 4, in the brake fluid pressure transmission route, the brake unit 30 and the brake pedal unit 40 are positioned on the most upstream side, and the brake actuator 20 is positioned on a downstream side of the brake unit 30 and the brake pedal unit 40. Thus, brake fluid pressure is supplied from the brake actuator 20 to the first to fourth brake calipers 11a, 12a, 13a, 14a.

The brake actuator 20 functions as a main generation source of brake fluid pressure in the braking device 10. The brake actuator 20 includes a brake ECU 21, an actuator body portion 22, a reservoir tank 25, and the electric motor 26. The brake ECU 21 is connected with the ECU 50 through a communication line, and configured so as to actuate the electric motor 26 based on a braking force request that is calculated by the ECU 50 based on information from a sensor, a camera, and so on (vehicle speed, a distance from a stop line or an obstacle, and so on) so that the electric motor 26 pumps up hydraulic fluid from the reservoir tank 25 and pressurizes the hydraulic fluid. This means that the brake actuator 20 is configured to generate brake fluid pressure as much as necessary (to an extent requested by the ECU 50) when necessary (when the ECU 50 makes a request).

The actuator body portion 22 is divided into a first fluid chamber 23 and a second fluid chamber 24. In the first fluid chamber 23, the first and second ports 23a, 23b are formed, and hydraulic fluid pressurized in the electric motor 26 based on the command from the brake ECU 21 is supplied from the first and second ports 23a, 23b to the first and second brake calipers 11a, 12a, respectively. Meanwhile, in the second fluid chamber 24, the third and fourth ports 24a, 24b are formed, and hydraulic fluid pressurized in the electric motor 26 based on the command from the brake ECU 21 is supplied from the third and fourth ports 24a, 24b to the third and fourth brake calipers 13a, 14a, respectively.

As described above, because the actuator body portion 22 is divided into two chambers, even if one of the fluid chambers is broken or the like, the brake fluid pressure is not allowed to escape, and can be supplied to the front wheels 2 or the rear wheels 3 from the other fluid chamber. Further, since the brake actuator 20 is positioned on the downstream side of the brake unit 30, even when the brake unit 30 has a malfunction, the brake actuator 20 is able to independently supply the brake fluid pressure to the first to fourth brake calipers 11a, 12a, 13a, 14a.

The brake unit 30 is an equivalent of a so-called master cylinder, and includes a brake ECU 31, a cylinder housing 32, first and second pistons 33, 34 (see FIG. 5) sliding inside the cylinder housing 32, a reservoir tank 35, and the electric motor 36. The brake unit 30 is configured so as to generate the brake fluid pressure in accordance with strokes of the first and second pistons 33, 34. The electric motor 36 is configured so as to pressurize the hydraulic fluid pumped up from the reservoir tank 35 and constantly maintain the hydraulic fluid at high pressure. The brake ECU 31 is connected with the ECU 50 through a communication line, and configured so as to open a second electromagnetic valve 39 (see FIG. 5) based on a braking force request calculated by the ECU 50 so that high-pressure hydraulic fluid is released. Thus, the first and second pistons 33, 34 are caused to slide within the cylinder housing 32 by the high-pressure hydraulic fluid. Accordingly, brake fluid pressure generated in accordance with strokes of the first and second pistons 33, 34 is supplied from the first and second ports 32a, 32b provided in the cylinder housing 32 to the first to fourth brake calipers 11a, 12a, 13a, 14a through the first and second fluid chambers 23, 24 of the brake actuator 20.

As described above, since the brake unit 30 generates the brake fluid pressure independently from the brake actuator 20, even when an electrical system of the brake actuator 20 has a malfunction, it is possible to supply the brake fluid pressure to the front wheels 2 or the rear wheels 3 in a case where at least one of the first and second fluid chambers 23, 24 is not damaged.

Meanwhile, the brake pedal unit 40 functions as a generation source of brake fluid pressure mainly when the brake actuator 20 and the brake unit 30 are inoperative. For example, the brake pedal unit 40 is configured so as to generate brake fluid pressure instead of the brake actuator 20 and the brake unit 30 when the vehicle 1 has power outage or the like.

The brake pedal unit 40 includes an input piston 41 (see FIG. 5) sliding inside the cylinder housing 32 of the brake unit 30, a brake pedal 43, a rod 42 connecting the input piston 41 and the brake pedal 43 with each other, an air cylinder 44, a solenoid box 45, a hose 46 connecting the air cylinder 44 and the solenoid box 45 with each other, and a hose 47 connecting the solenoid box 45 and the air tank 15 with each other. The air cylinder 44 is configured so as to be actuated by compressed air that is filled in the air tank 15 as a valve (not shown) inside the solenoid box 45 is opened when a given condition such as power outage of the vehicle 1 is satisfied, and the brake pedal 43 is thus rotated. The brake pedal 43 is rotated by the air cylinder 44, and pushes the input piston 41 (see FIG. 5) towards a pressurizing side. Thus, the first and second pistons 33, 34 of the brake unit 30 are caused to have strokes and generate brake fluid pressure. The brake pedal 43 is biased by a spring (not shown) to an opposite direction of the direction in which the input piston 41 is pushed into the pressurizing side, and, as the valve inside the solenoid box 45 closes, the brake pedal 43 returns to its original position.

As described above, the brake fluid pressure generated in accordance with strokes of the first and second pistons 33, 34 is supplied from the first and second ports 32a, 32b provided in the cylinder housing 32 to the first to fourth brake calipers 11a, 12a, 13a, 14a through the first and second fluid chambers 23, 24 of the brake actuator 20. This means that, in the embodiment, the cylinder housing 32 and the first and second pistons 33, 34 are used for both the brake unit 30 and the brake pedal unit 40.

As described above, since the brake pedal unit 40 generates brake fluid pressure independently from the brake actuator 20 and the brake unit 30, even when, for example, electrical systems of the brake actuator 20 and the brake unit 30 have malfunctions, the brake pedal unit 40 is able to supply brake fluid pressure to the front wheels 2 and the rear wheels 3 as long as the given condition is satisfied.

As described above, in the embodiment, (A) at normal time when the electrical system has no malfunction or the like, the brake actuator 20 serves as the main generation source of brake fluid pressure and supplies the brake fluid pressure.

Meanwhile, (B) at abnormal time when the electrical system and so on have a malfunction, (B-1) the brake unit 30 supplies the brake fluid pressure in a case where the brake actuator 20 has a malfunction, and (B-2) the brake pedal unit 40 supplies the brake fluid pressure when the brake actuator 20 and the brake unit 30 have malfunctions due to power outage or the like.

Then, the first to fourth brake calipers 11a, 12a, 13a, 14a actuate wheel cylinders (not shown) installed inside thereof, respectively, with use of the brake fluid pressure supplied from the first to fourth ports 23a, 23b, 24a, 24b. Thus, brake pads (not shown) are pressed against the first to fourth brake discs 11b, 12b, 13b, 14b, respectively, thus generating frictional braking force. As a result, the vehicle 1 is decelerated or stopped.

Next, an example of a device configuration is described briefly. With this device configuration, only the brake actuator 20 is actuated in the case of (A), and the brake unit 30 is actuated in the case of (B-1), while the brake pedal unit 40 is actuated in the case of (B-2).

Figure 5:
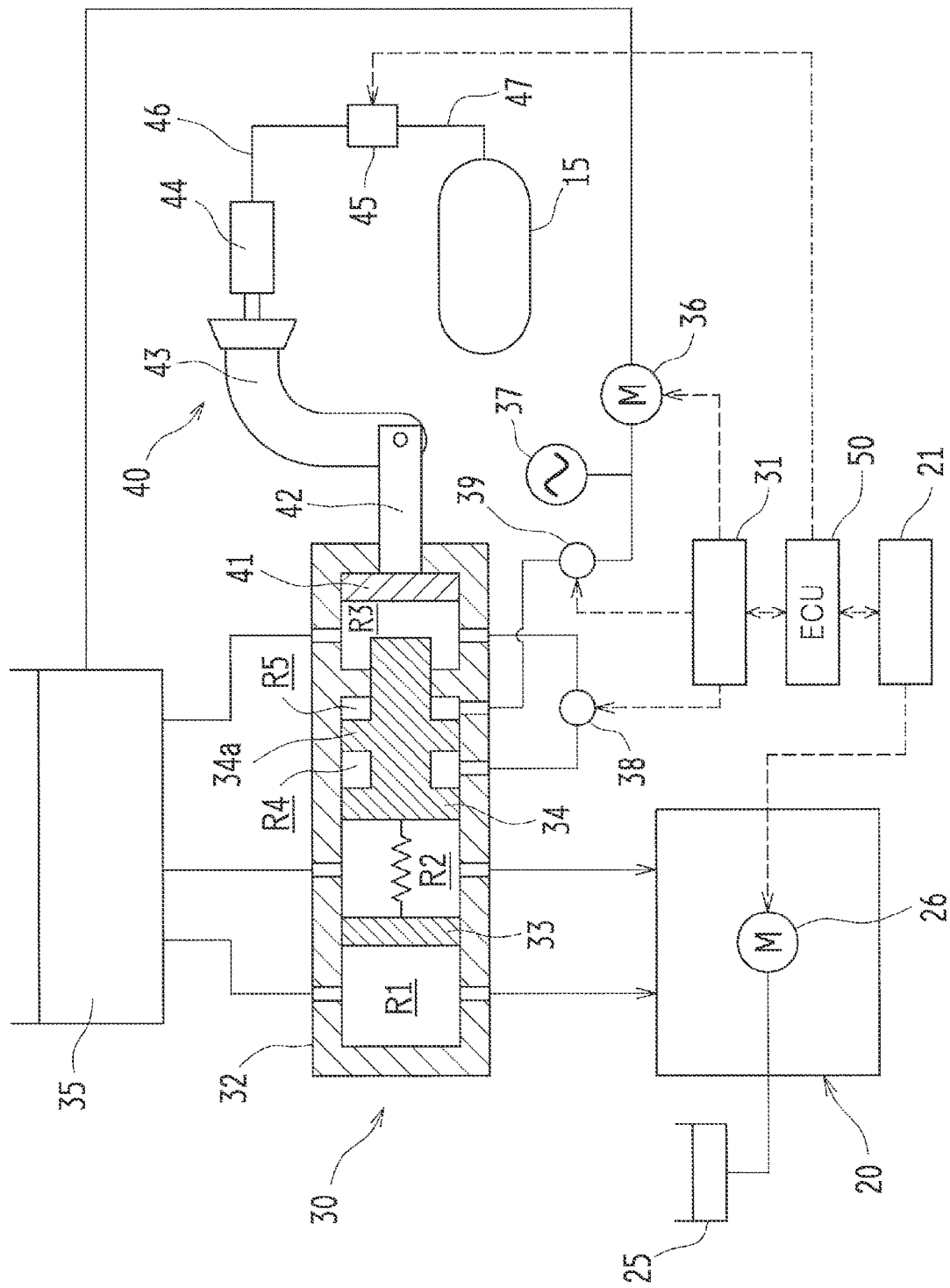
FIG. 5 is a view of a rough configuration of the brake fluid pressure generation device.

FIG. 5 is a view of a rough configuration of the generation source of brake fluid pressure. FIG. 5 only shows an outline, and does not show precise configurations of the brake actuator 20, the brake unit 30, the brake pedal unit 40, and so on.

As shown in FIG. 5, the first piston 33, the second piston 34, and the input piston 41 are housed in the cylinder housing 32 in a slidable manner. Also, first to fifth fluid chambers R1, R2, R3, R4, R5 are formed dividedly from each other in the cylinder housing 32. The first fluid chamber R1 is connected with the reservoir tank 35 and the first fluid chamber 23 of the brake actuator 20, and the hydraulic fluid inside the first fluid chamber R1 is pressurized by the first piston 33. The second fluid chamber R2 is formed between the first piston 33 and the second piston 34, and is connected with the reservoir tank 35 and the second fluid chamber 24 of the brake actuator 20. The hydraulic fluid inside the second fluid chamber R2 is pressurized by the second piston 34. In the second piston 34, a rib portion 34a is provided, and the fourth fluid chamber R4 is formed dividedly on a first side (on a side of the first and second fluid chambers R1, R2) of the rib portion 34a, and the fifth fluid chamber R5 is formed dividedly on a second side (a side of the third fluid chamber R3) of the rib portion 34a. The third fluid chamber R3 is connected with the reservoir tank 35 and the fourth fluid chamber R4, and the hydraulic fluid inside the third fluid chamber R3 is pressurized by the input piston 41. The third fluid chamber R3 and the fourth fluid chamber R4 are connected with each other through a first electromagnetic valve 38 that opens in an energized state.

The brake ECU 31 of the brake unit 30 is configured so as to drive the electric motor 36 so that the electric motor 36 pumps up the hydraulic fluid from the reservoir tank 35 and pressurizes the hydraulic fluid. The hydraulic fluid is stored in an accumulator 37 in a pressurized state. The accumulator 37 is connected with the fifth fluid chamber R5 through a second electromagnetic valve 39 that opens in the energized state. The brake ECU 31 is configured so as to maintain the first electromagnetic valve 38 in the energized state except when the brake ECU 31 actuates the brake pedal unit 40, and also maintain the second electromagnetic valve 39 in a non-energized state except when the brake ECU 31 actuates the brake unit 30.

The air cylinder 44 is connected with the air tank 15 through the solenoid box 45 in which the valve inside the solenoid box 45 closes in the energized state. The ECU 50 is configured so as to maintain the solenoid box 45 in the energized state except when the ECU 50 actuates the brake pedal unit 40.

With the foregoing configurations, in the case of (A) described above, as the brake ECU 31 closes the second electromagnetic valve 39 (the non-energized state), and the brake ECU 21 of the brake actuator 20 actuates the electric motor 26 so that the electric motor 26 pumps up the hydraulic fluid from the reservoir tank 25 and pressurizes the hydraulic fluid, the vehicle 1 is decelerated or stopped by the brake fluid pressure from the brake actuator 20 only.

On the contrary, in the case of (B-1) described above, the brake ECU 31 brings the second electromagnetic valve 39 into the energized state so that the second electromagnetic valve 39 opens, and supplies the hydraulic fluid stored in the accumulator 37 in the pressurized state to the fifth fluid chamber R5. Here, since the first electromagnetic valve 38 is in the energized state (a valve open state), fluid pressure in the third fluid chamber R3 and fluid pressure in the fourth fluid chamber R4 that faces the third fluid chamber R3 cancel each other. Therefore, the second piston 34 operates only with fluid pressure in the fifth fluid chamber R5. Thus, in the case of (B-1) described above, the vehicle 1 is decelerated or stopped by the brake fluid pressure from the brake unit 30 only.

Meanwhile, in the case of (B-2) described above, the first electromagnetic valve 38 closes and the valve inside the solenoid box 45 opens due to, for example, power outage. Then, compressed air filled in the air tank 15 actuates the air cylinder 44, and the brake pedal 43 is rotated. Accordingly, the input piston 41 is pressed into a pressurizing side, and fluid pressure of the third fluid chamber R3 increases. Here, when the first electromagnetic valve 38 is closed, the fluid pressure in the third fluid chamber R3 and the fluid pressure in the fourth fluid chamber R4 facing the third fluid chamber R3 do not cancel each other. Therefore, the second piston 34 is operated only by the fluid pressure in the third fluid chamber R3. Thus, the vehicle 1 is decelerated or stopped by the brake fluid pressure from the brake pedal unit 40 only.

As described above, it is possible to decelerate or stop the vehicle 1 according to the embodiment with use of power of the battery 52 at normal time, and with use of compressed air in the air tank 15 without a need of stepping force or the like applied by a driver when the vehicle 1 has power outage or the like. Therefore, as described above, it is possible to employ a layout in which the brake pedal is not permanently provided inside the vehicle cabin 4.

Arrangement of Brake Fluid Pressure Generation Devices

Figure 6:
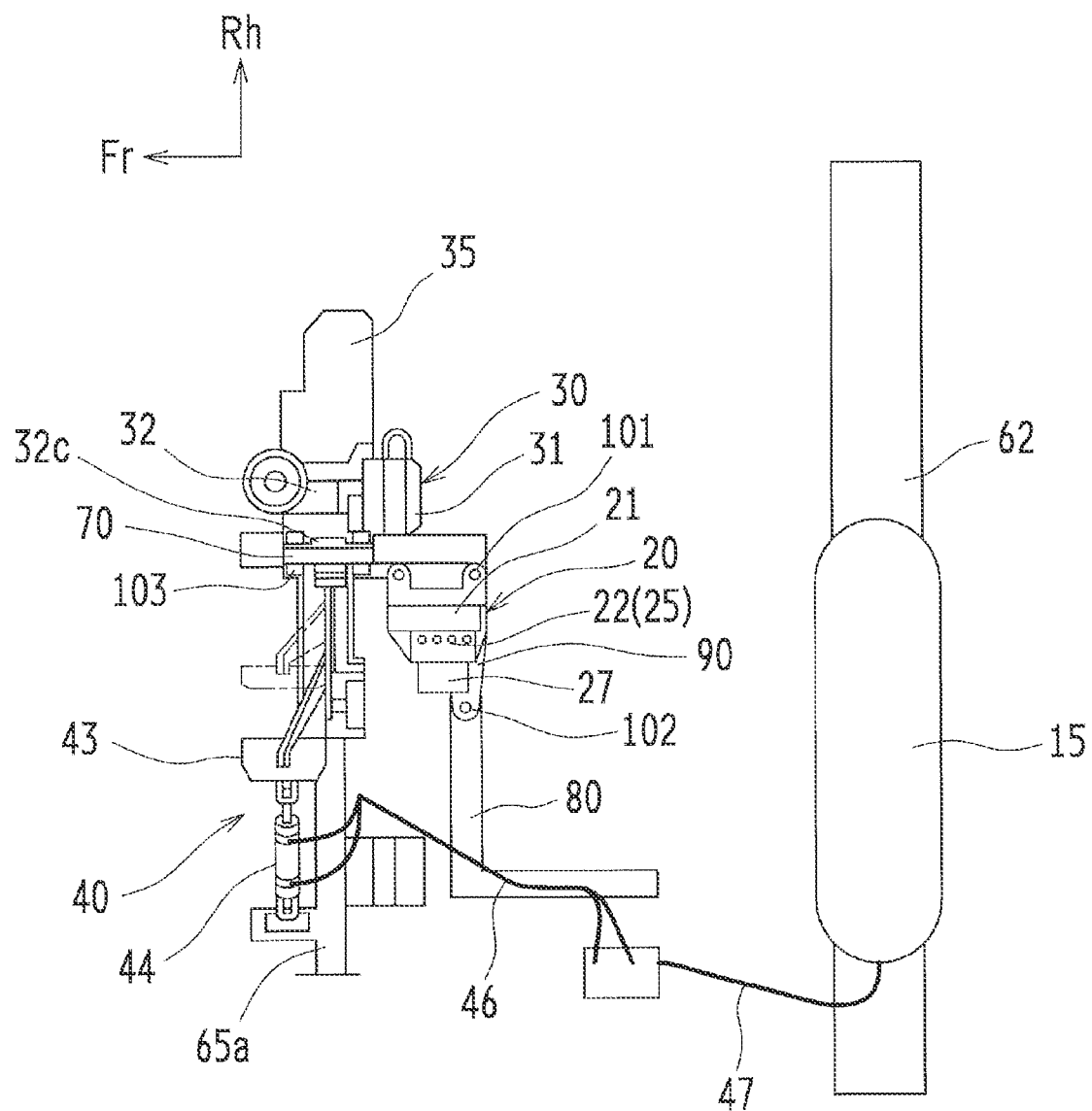
FIG. 6 is a schematic plan view of the brake fluid pressure generation device.
Figure 7:
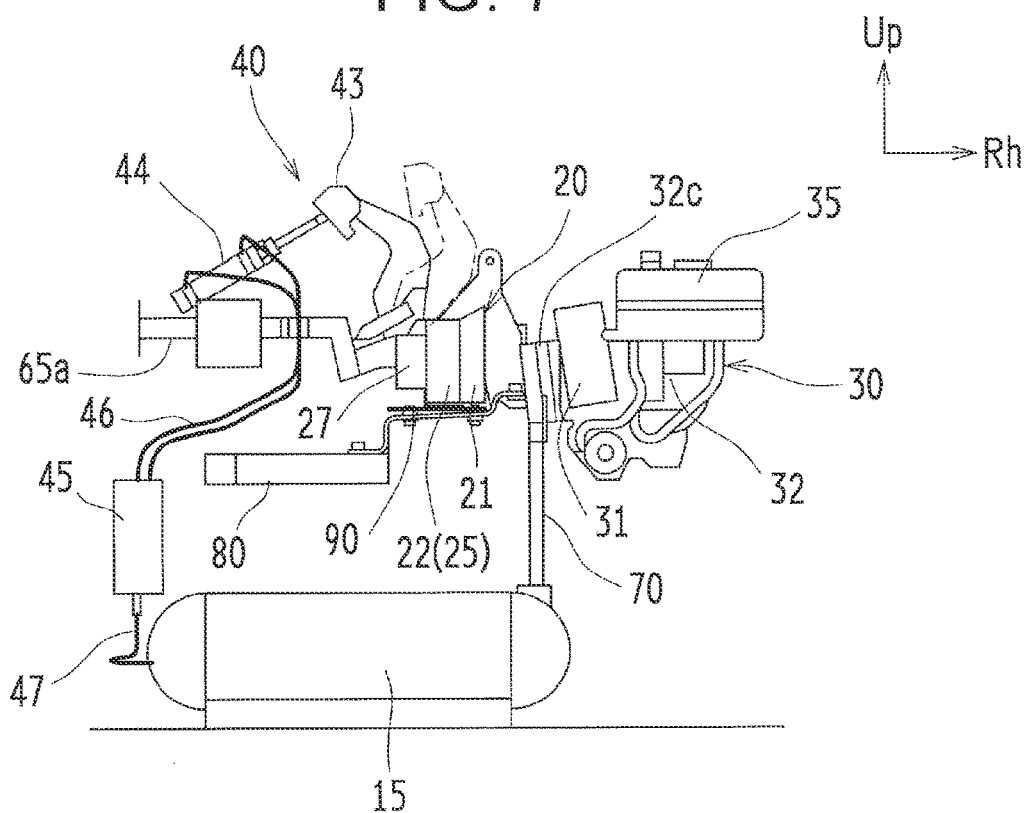
FIG. 7 is a schematic back view of the brake fluid pressure generation device.
Figure 8:
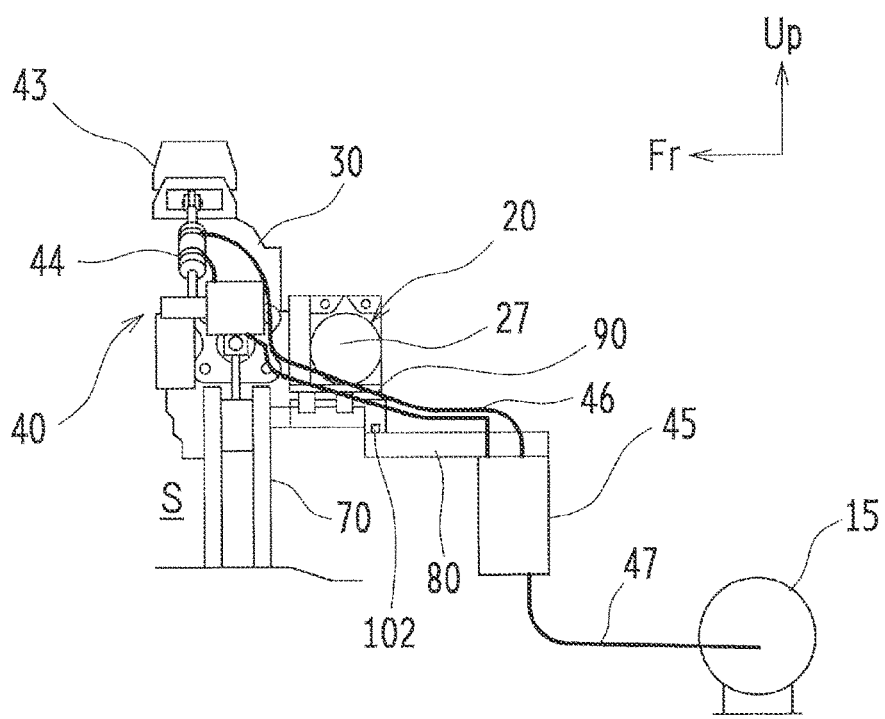
FIG. 8 is a schematic side view of the brake fluid pressure generation device.
Figure 10:
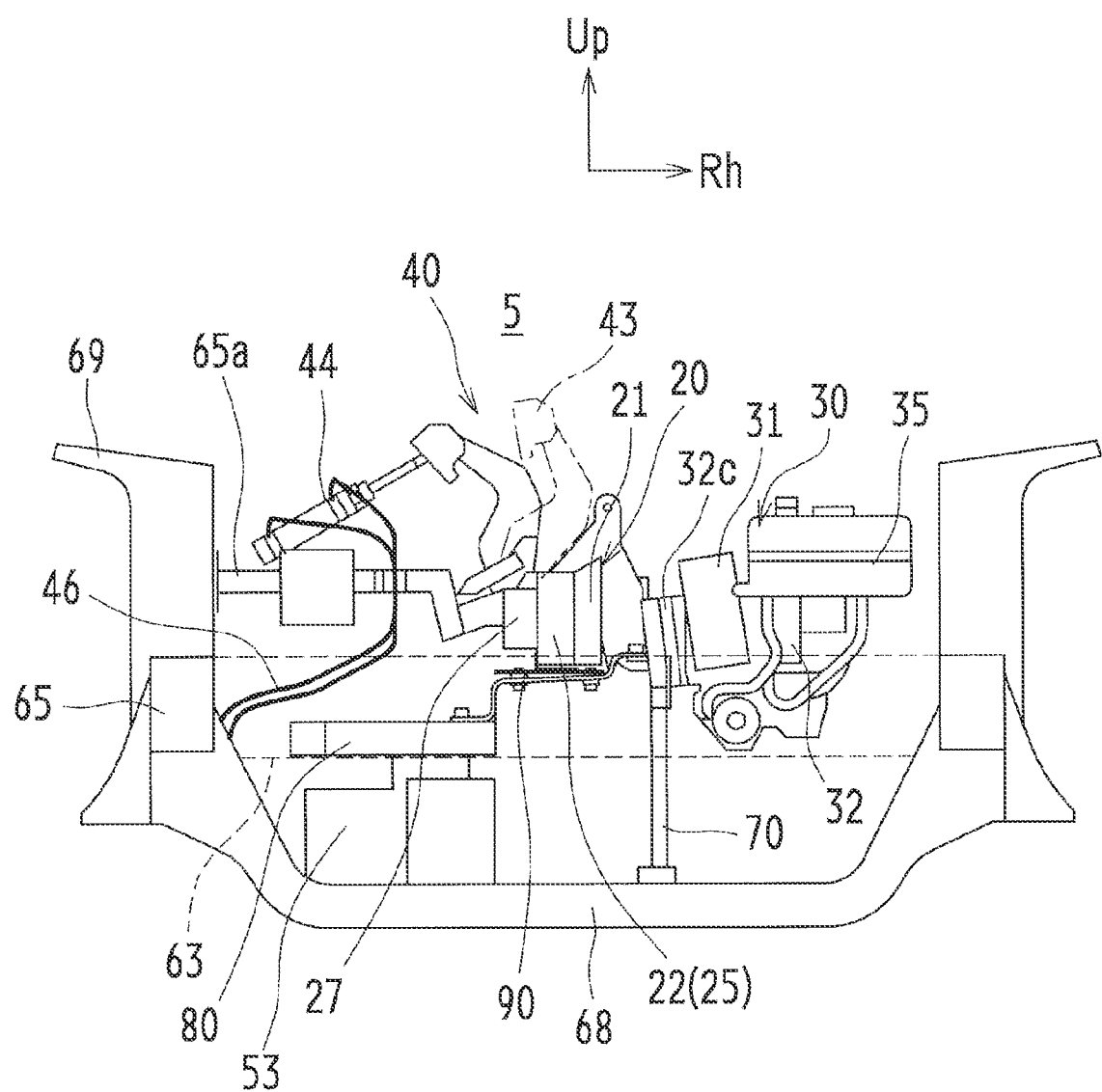
FIG. 10 is a schematic back view of the brake fluid pressure generation device mounted on the vehicle.
Figure 11:
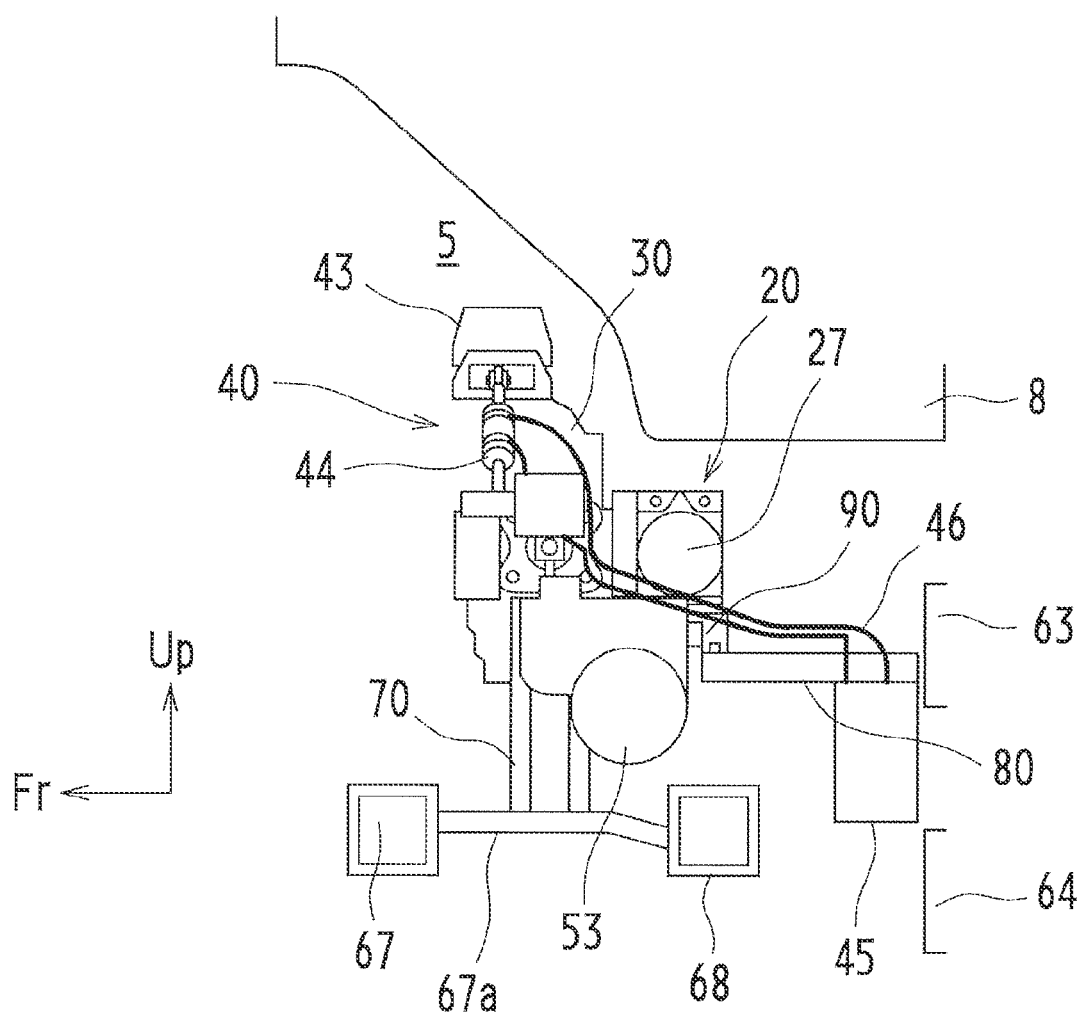
FIG. 11 is a schematic side view of the brake fluid pressure generation device mounted on the vehicle.

Next, the configurations and arrangement of the brake actuator 20, the brake unit 30, and the brake pedal unit 40 in the front-side storage chamber 5 are described. FIG. 6 to FIG. 8 are plan view, a back view, and a side view, respectively, that schematically show the brake fluid pressure generation devices 20, 30, 40. Also, FIG. 9 to FIG. 11 are a plan view, a back view, and a side view, respectively, that schematically show the brake fluid pressure generation devices 20, 30, 40 mounted on the vehicle.

First of all, the front-side storage chamber 5 is described briefly. As shown in FIG. 9, a pair of right and left side rails 61 is provided in a location corresponding to the underfloor space 6 shown in FIG. 2. The right and left side rails 61 extend in the vehicle front-rear direction at both end portions of the underfloor space 6, respectively, in the vehicle width direction. The side rails 61 are connected with each other by a crossmember 62 extending in the vehicle width direction. Front end portions of the side rails 61 are connected with a lower crossmember 64 out of two crossmembers 63, 64 arrayed above and below each other as shown in FIG. 11. The front-side storage chamber 5 is formed in front of the crossmembers 63, 64 in the vehicle front-rear direction.

Figure 9:
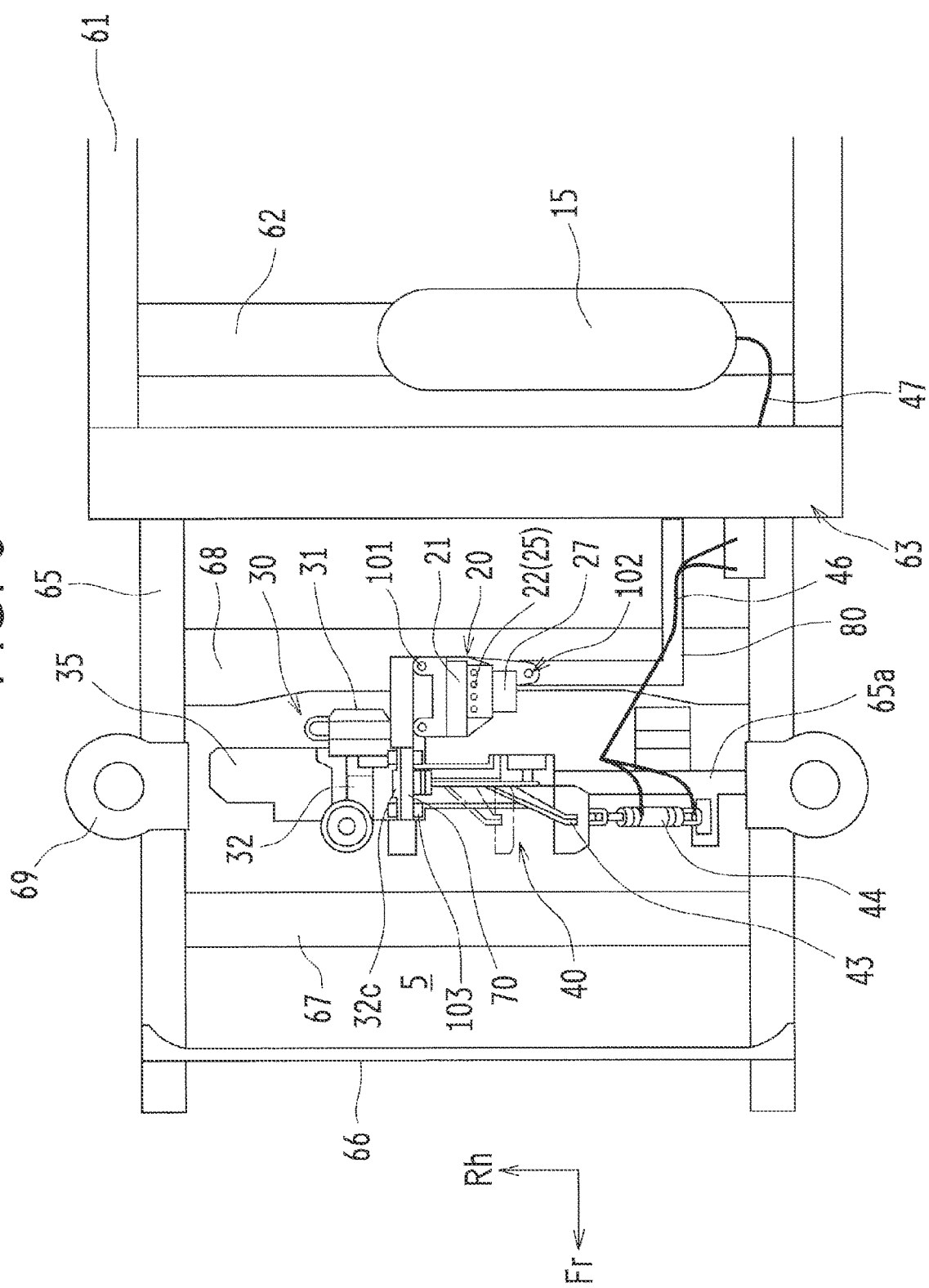
FIG. 9 is a schematic plan view of the brake fluid pressure generation device mounted on a vehicle.

Specifically, as shown in FIG. 9, a pair of right and left side rails 65 is provided, the right and left side rails 65 extend frontward in the vehicle front-rear direction from both end portions of the upper crossmember 63 in the vehicle width direction, respectively, and front end portions of the right and left side rails 65 are connected with each other by a crossmember 66. Also, a pair of front and rear crossmembers 67, 68 extending in the vehicle width direction stretch over between the right and left side rails 65 below the side rails 65 and the crossmembers 63, 66. As shown in FIG. 10, each of the crossmembers 67, 68 extends in the vehicle width direction, and both end portions of each of the crossmembers 67, 68 extend while being inclined upwardly toward outer sides in the vehicle width direction, respectively, and are attached to lower portions of the side rails 65, respectively. Reference numeral 69 in FIG. 9 and FIG. 10 represents a suspension tower.

With this configuration, right and left sides of the front-side storage chamber 5 are defined by the right and left side rails 65, respectively, and front and rear sides of the front-side storage chamber 5 are defined by the crossmembers 63, 66, respectively. Also, a lower side of the front-side storage chamber 5 is defined by the crossmembers 67, 68.

As shown in FIG. 6 and FIG. 7, in the brake unit 30, the reservoir tank 35 is provided above the cylinder housing 32 extending in a sliding direction of the first and second pistons 33, 34. The reservoir tank 35 extends in the same direction as the cylinder housing 32. Therefore, as the brake unit 30 as a whole, a length of the brake unit 30 in the extending direction of the cylinder housing 32 (a longitudinal direction) is larger than a length of the brake unit 30 in a direction orthogonal to the extending direction of the cylinder housing 32 (a direction perpendicular to the longitudinal direction) and a length of the brake unit 30 in an up-down direction. The brake ECU 31 is provided on a side surface of the cylinder housing 32.

As described above, the brake unit 30 having its longitudinal direction in the extending direction of the cylinder housing 32 (the sliding direction of the first and second pistons 33, 34) is arranged in the front-side storage chamber 5 so that the longitudinal direction of the brake unit 30 becomes parallel to the vehicle width direction as shown in FIG. 9 and FIG. 10. Specifically, as shown in FIG. 11, a support bracket 67*a* extending in the vehicle front-rear direction stretches over between the two crossmembers 67, 68 arrayed in the front-rear direction. As a flange portion 32*c* of the cylinder housing 32 is fastened by a bolt 103 to an upper end portion of a first bracket 70 extending upwardly from the support bracket 67*a*, the brake unit 30 is arranged so that its longitudinal direction is along the vehicle width direction.

Further, as shown in FIG. 6 and FIG. 9, the brake pedal unit 40 that shares the cylinder housing 32 with the brake unit 30 is arranged in the front-side storage chamber 5 so as to be arrayed with the brake unit 30 in the vehicle width direction. Specifically, the rod 42 extends in the vehicle width direction, the rod 42 being connected with the input piston 41 housed in the cylinder housing 32 extending in the vehicle width direction. Therefore, the brake pedal 43 attached to a distal end portion of the rod 42 so as to rotate is also arrayed with the brake unit 30 in the vehicle width direction. Further, the air cylinder 44 that rotates the brake pedal 43 is fixed to a bracket 65*a* extending from the side rail 65 in the vehicle width direction so that the air cylinder 44 is arrayed with the brake unit 30 and the brake pedal 43 in the vehicle width direction. The air tank 15 that supplies compressed air to the air cylinder 44 is arranged above the crossmember 62 that is provided behind the front-side storage chamber 5.

Thus, according to the embodiment, as shown in FIG. 6 and FIG. 9, the brake unit 30 and the brake pedal unit 40 extending in the vehicle width direction are almost linearly aligned with each other in the vehicle width direction.

In the brake actuator 20, as shown in FIG. 6 and FIG. 7, the brake ECU 21, the actuator body portion 22 (including the reservoir tank 25), and a motor housing 27 that houses the electric motor 26 are provided so as to be arrayed in this order. Therefore, in the brake actuator 20 as a whole, its length in an array direction (also referred to as an arrangement direction) is larger than its length in a direction orthogonal to the arrangement direction and its length in the up-down direction.

As described above, as shown in FIG. 9 and FIG. 10, the brake actuator 20 formed so as to be long in the arrangement direction is arranged behind the brake pedal 43 in the vehicle front-rear direction (near the brake unit 30 and behind the brake unit 30 in the vehicle front-rear direction) in the front-side storage chamber 5. Thus, the longitudinal direction (the arrangement direction) of the brake actuator 20 is parallel to the vehicle width direction.

Specifically, as shown in FIG. 9 and FIG. 11, an L-shaped second bracket 80 is attached to the upper crossmember 63. The second bracket 80 extends frontward from the front end of the crossmember 63 in the vehicle front-rear direction, is bent at a right angle, and then extends to the right side in the vehicle width direction. A distal end portion of the second bracket 80 and the upper end portion of the first bracket 70 are connected with an actuator bracket 90 through bolts 101, 102, respectively. Thus, the first and second brackets 70, 80, and the actuator bracket 90 are integrated with each other. Since the brake actuator 20 is fastened to the actuator bracket 90 by the bolt as described above, the brake actuator 20 is arranged so as to extend in the vehicle width direction behind the brake pedal 43 in the vehicle front-rear direction.

Here, as shown in FIG. 7 and FIG. 8, the brake actuator 20, the brake unit 30, and the brake pedal unit 40 are arranged in the front-side storage chamber 5 at almost the same height. Also, because it is assumed that the brake pedal 43 is normally rotated by stepping force applied by a driver, the brake pedal 43 is rotated below the rod 42. However, in the embodiment, since the brake pedal 43 is rotated by the air cylinder 44, the brake pedal 43 is rotated above the rod 42 as shown in FIG. 7 and FIG. 8.

Thus, as shown in FIG. 8, a relatively wide space S is made under the brake actuator 20 and the brake pedal unit 40 in the front-side storage chamber 5. Therefore, in the embodiment, as shown in FIG. 10 and FIG. 11, an air conditioner unit 53 is arranged inside the space S.

With the braking device 10 configured as above according to the embodiment, its functional configuration, structure, and arrangement produce the following effects.

Since the brake unit 30 is arranged so that its longitudinal direction is along the vehicle width direction, it is possible to reduce a size of the front-side storage chamber 5, and it is thus possible to increase the space for the vehicle cabin 4. Further, as the brake pedal unit 40 is arranged so as to be arrayed with the brake unit 30 in the vehicle width direction, it is possible to reduce the size of the front-side storage chamber 5 while fail safe is achieved. Furthermore, because the brake pedal unit 40 is pneumatically actuated, it is not necessary to provide the brake pedal or its equivalent in the vehicle cabin 4. Therefore, it is possible to further increase the space for the vehicle cabin 4.

Moreover, the brake actuator 20 is arranged behind the brake unit 30 in the vehicle front-rear direction. Therefore, when the brake unit 30 is damaged at the time of vehicle collision, it is possible to lower the possibility of breakage of the brake unit 30, and it is also possible to avoid that the entire braking device 10 has a malfunction. Further, as the brake actuator 20 is arranged near the brake unit 30 in the front-side storage chamber 5, it is possible to reduce lengths of the first to fourth brake pipes 11, 12, 13, 14, and it is also possible to maintain a compact size of the front-side storage chamber 5. Also, as the brake unit 30 and the brake pedal unit 40 are arranged so as to be arrayed with the air conditioner unit 53 in the up-down direction, it is possible to further reduce the size of the front-side storage chamber 5.

Accordingly, the combination of the compact front-side storage chamber 5, and the front-side and rear-side storage chambers 5, 7 being formed so as to partially overlap the vehicle cabin 4 in the vehicle front-rear direction makes it possible to increase the space for the vehicle cabin 4 more reliably.

Parking Brake Function

Incidentally, in a case where the brake actuator 20 or the brake unit 30 is applied to a parking brake for the vehicle 1 to park, the electric motor 26 needs to be always driven when the brake actuator 20 is applied, and the second electromagnetic valve 39 or the like needs to be maintained in the energized state while the electric motor 36 needs to maintain the hydraulic fluid at high pressure when the brake unit 30 is applied. Therefore, electricity consumption is increased.

It is possible to consider application of a type of parking brake, to the vehicle 1, that allows drum brakes actuated by a wire cable to cramp the rear wheels 3. However, retaining force will be insufficient compared to a brake that cramps all four wheels. Also, when the drum brakes are used for all four wheels, the number of components, a weight of a vehicle body, and manufacturing cost are increased.

Thus, in the embodiment, the brake pedal unit 40 is also actuated as a substitute for the parking brake.

Specifically, in the braking system according to the embodiment, an emergency stop button ESB and an emergency brake circuit 110 are provided in addition to the braking device 10. The emergency stop button ESB is provided in the vehicle cabin 4 and actuates the brake actuator 20, the brake unit 30, or the brake pedal unit 40 independently from the automated driving. The emergency brake circuit 110 generates braking force with use of the brake pedal unit 40 in the case of (1) the non-energized state, or in the case of (2) transition to the non-energized state after the emergency stop button ESB is operated. The emergency stop button ESB and the emergency brake circuit 110 are described in detail below.

First of all, the emergency stop button ESB provided in the vehicle cabin 4 may be a button icon in an image on the tablet PC owned by an operator inside the vehicle cabin 4 as described earlier. Also, the emergency stop button ESB may be a button switch provided on an inner wall surface of the vehicle cabin 4.

Figure 12:
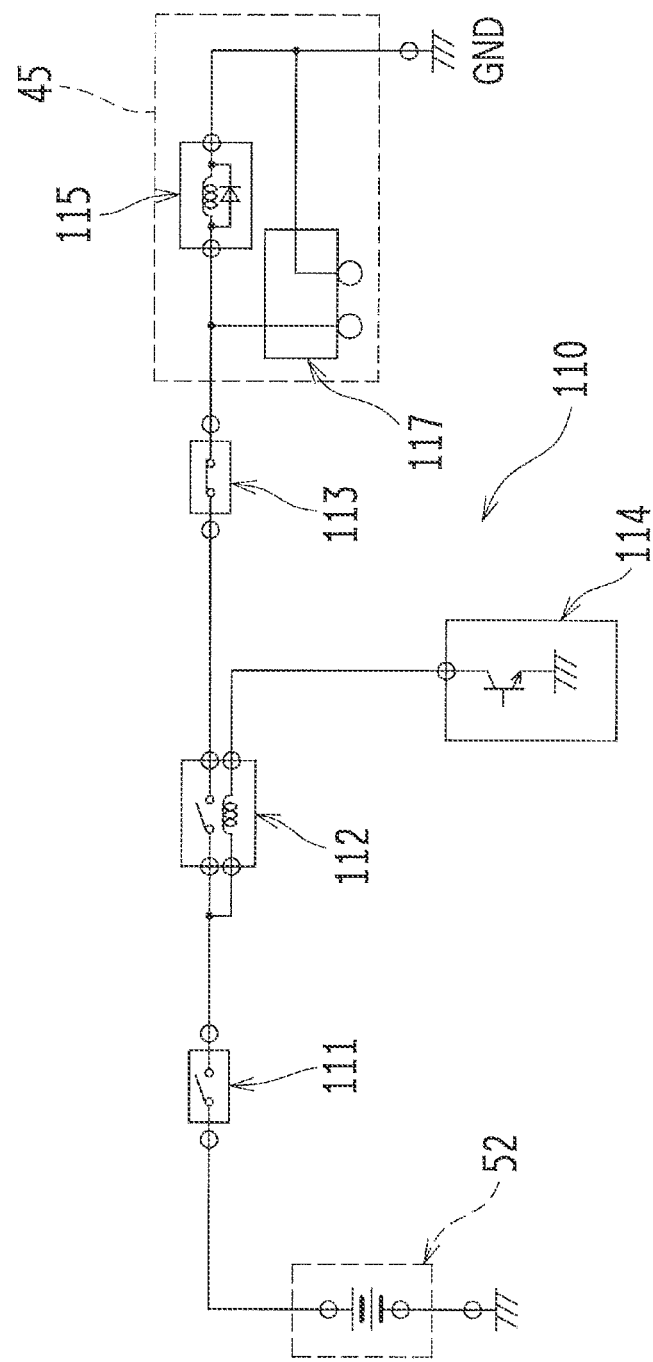
FIG. 12 is a schematic view of an emergency brake circuit.

FIG. 12 is a schematic view of the emergency brake circuit 110. The emergency brake circuit 110 includes the battery 52 serving as an internal power source, a start switch 111, a relay switch 112, an operation switch 113, a solenoid 115, an automated driving interface box 114, and a junction box 117. As shown in FIG. 12, the battery 52, the start switch 111, the relay switch 112, the operation switch 113, and the solenoid 115 are connected with each other in series in this order.

The start switch 111 commands the vehicle 1 to start its system, and is connected with the ECU 50 and so on through a communication line. The start switch 111 may be provided on, for example, the inner wall surface of the vehicle cabin 4, or may be operated in conjunction with the button icon in the image on the tablet PC owned by the operator. The start switch 111 is configured so as to allow a current to flow when it is turned on, and cut off the current when it is turned off.

The automated driving interface box 114 controls exchanges of signals regarding automated driving control between the ECU 50 and the onboard equipment. The relay switch 112 is connected with the automated driving interface box 114 through a communication line. The relay switch 112 is configured so as to allow a current to flow when a signal is input from the automated driving interface box 114, and also to cut off the current when no signal is input. This means that the relay switch 112 is configured so as to allow a current to flow when the automated driving is executed (when the automated driving is turned on), and to cut off the current when the automated driving is not executed (when the automated driving is turned off).

The operation switch 113 is operated in conjunction with the emergency stop button ESB. The operation switch 113 is connected with the emergency stop button ESB through, for example, the ECU 50, and the operation switch 113 is turned on or off once a given period of time elapses after the emergency stop button ESB is operated. Specifically, the operation switch 113 is turned off and cuts off the current as the emergency stop button ESB is turned on, and the operation switch 113 is turned on and allows the current to flow as the emergency stop button ESB is turned off.

The solenoid 115 is provided in the solenoid box 45, and is configured so as to close the valve inside the solenoid box 45 in the energized state, and also to open the valve inside the solenoid box 45 in the non-energized state.

With such a configuration, in the emergency brake circuit 110, when the start switch 111 is turned on, the automated driving is turned on, and the operation switch 113 is turned on (the emergency stop button ESB is turned off), the solenoid 115 is brought into the energized state. Therefore, the brake pedal unit 40 is not actuated.

Meanwhile, in the emergency brake circuit 110, when the start switch 111 is turned off, the automated driving is turned off, or the operation switch 113 is turned off (the emergency stop button ESB is turned on), the solenoid 115 is brought into the non-energized state. Therefore, the brake pedal unit 40 is actuated.

Under the conditions described above, description is given regarding a case where the emergency brake circuit 110 is maintained in the energized state even after the emergency stop button ESB is operated, and also the cases of (1) and (2) described earlier.

First of all, the case where the energized state is maintained even after the emergency stop button ESB is operated means a state where the emergency brake circuit 110 is maintained in the energized state even after elapse of the given period of time after the signal indicating that the emergency stop button ESB is turned on is input to the ECU 50, in other words, a state where the start switch 111 is not turned off and also the automated driving continues.

This case happens when, for example, an operator presses (turns on) the emergency stop button ESB as the brake actuator 20 and the brake unit 30 that are supposed to operate are not actuated because no command is generated from the ECU 50 due to a malfunction of the sensor or the like even though there is a pedestrian, an obstacle, or the like in front of the vehicle 1.

In this case, the brake actuator 20 and the brake unit 30 themselves have no malfunction. Therefore, the brake actuator 20 or the brake unit 30 may be actuated by a command from the ECU 50 to the brake ECU 21 or the brake ECU 31. Alternatively, the operation switch 113 may be turned off so that the solenoid 115 is brought into the non-energized state, and the brake pedal unit 40 is actuated. This means that it is possible to generate braking force with use of brake fluid pressure in any one of the brake actuator 20, the brake unit 30, and the brake pedal unit 40, thereby realizing the emergency stop brake function.

In the case where the brake fluid pressure generation device is limited to the brake pedal unit 40 at the time of emergency stop like this, the operation switch 113 itself may be provided inside the vehicle cabin 4 as the emergency stop button ESB. In this case, once the emergency stop button ESB is turned on (the operation switch 113 is turned off), the brake pedal unit 40 is actuated immediately (before the elapse of the given period of time).

Next, the case of (1) the non-energized state is, for example, a case where the vehicle 1 has power outage (in the case of the (B-2) described earlier), a case in which the automated driving is interrupted due to some kind of malfunction, or the like. In this case, voltage is not supplied from the battery 52, or the relay switch 112 cuts off a current. Therefore, the solenoid 115 is brought into the non-energized state, and the brake pedal unit 40 is actuated.

Further, the case of (2) transition to the non-energized state after the emergency stop button ESB is operated means a case where the emergency brake circuit 110 is brought into the non-energized state from the energized state before the elapse of the given period of time after a signal indicating that the emergency stop button ESB is turned on is input to the ECU 50.

This kind of case happens when, for example, an operator who confirmed that the vehicle 1 had reached a destination presses (turns on) the emergency stop button ESB and then turns off the start switch 111 in order to park the vehicle 1 before the brake operation is performed by the automated driving.

In this case, the start switch 111 is turned off or the operation switch 113 is turned off. Therefore, the solenoid 115 is brought into the non-energized state, and the brake pedal unit 40 is actuated. This means that the brake fluid pressure from the brake pedal unit 40 realizes the parking brake function. As shown in FIG. 4 described earlier, the brake fluid pressure generated by the brake pedal unit 40 is supplied to the first to fourth brake calipers 11a, 12a, 13a, 14a, and it is thus possible to cramp all of the front wheels 2 and the rear wheels 3.

Even in a case where the start switch 111 is turned off after the vehicle 1 is stopped by the automated driving, the emergency brake circuit 110 is brought into the non-energized state, and the brake pedal unit 40 is operated, thereby realizing the parking brake function.

Unlocking

In the case of (2) described earlier, when the start switch 111 is turned on again, the solenoid 115 is brought into the energized state, and the valve inside the solenoid box 45 is closed. Therefore, as described above, the brake pedal 43 is returned to its original position by biasing force of the spring, and the parking brake function is released.

Of course, when the vehicle 1 has power outage and the parking brake function is realized, the emergency brake circuit 110 remains in the non-energized state even when the start switch 111 is turned on. Therefore, locked states of the front wheels 2 and the rear wheels 3 continue. Therefore, in order to, for example, move a breakdown vehicle with a wrecker, it is necessary to unlock the front wheels 2 and the rear wheels 3.

Thus, in the braking system according to the embodiment, the emergency brake circuit 110 is configured so that an external power source is connected with the emergency brake circuit 110 and that braking force from the brake pedal unit 40 is thus released even in the non-energized state. Specifically, as shown in FIG. 12, the junction box 117 that is electrically connected with the solenoid 115 in parallel is arranged on the emergency brake circuit 110.

Because of this, even if the vehicle 1 has power outage, as long as the external power source is connected with the junction box 117, a pseudo energized state, in other words, a state in which a current flows through the solenoid 115 is created, and actuation of the brake pedal unit 40 is prohibited. Therefore, it is possible to unlock the front wheels 2 and the rear wheels 3 easily. The external power source may be connected with the junction box 117 from a side of the vehicle cabin 4 as, for example, an opening (not shown) is provided in the frame member or the like 8 that divides the front-side storage chamber 5 and the vehicle cabin 4 from each other.

In terms of relations with the claims, the brake actuator 20, the brake unit 30, and the brake pedal unit 40 correspond to "a plurality of brake fluid pressure generation devices that is provided in a storage chamber divided from a vehicle cabin, each of the brake fluid pressure generation devices being configured to generate brake fluid pressure" according to the present disclosure. The brake unit 30 corresponds to "an electrically actuated brake fluid pressure generation device that includes a cylinder and a piston configured to slide inside the cylinder, the electrically actuated brake fluid pressure generation device being configured to generate brake fluid pressure in accordance with a stroke of the piston" according to the present disclosure. The brake pedal unit 40 corresponds to "a non-electrically actuated brake fluid pressure generation device that includes an air cylinder, and a brake pedal stored in the storage chamber, the air cylinder being configured to be actuated as an emergency stop brake operating unit is operated, and the brake pedal being configured to be pushed into the air cylinder and to cause the piston to stroke" according to the present disclosure. The emergency stop button ESB that is the button icon in the image on the tablet PC owned by the operator in the vehicle cabin 4 corresponds to "an emergency stop brake operating unit that is provided inside the vehicle cabin and is configured to actuate the brake fluid pressure generation devices independently from the automated driving" according to the present disclosure.

Actions and Effects

With the braking system with the above-described configuration according to the embodiment, when the energized state is maintained after the emergency stop button ESB is operated, any one of the brake actuator 20, the brake unit 30, and the brake pedal unit 40 functions as the emergency stop brake. Therefore, it is possible to ensure that collision is avoided.

Further, in the case of (1) the non-energized state, the brake pedal unit 40 that is non-electrically actuated functions as the emergency stop brake. Therefore, it is possible to achieve fail safe.

Furthermore, in the case of (2) transition to the non-energized state after the emergency stop button ESB is operated, the brake pedal unit 40 that is non-electrically actuated functions as the parking brake. At the same time, brake fluid pressure from the brake pedal unit 40 is able to make all of the front wheels 2 and the rear wheels 3 cramped.

As described above, since the brake pedal unit 40 that is non-electrically actuated has the function as the emergency stop brake as well as the function as the parking brake, it is possible to realize the parking brake generating high retaining force with a simple configuration.

Further, with a simple operation of connecting the external power source with the junction box 117 provided in the emergency brake circuit 110, it is possible to release braking force from the brake pedal unit 40 that is non-electrically actuated. Therefore, it is possible to easily move the vehicle 1 that is broken down.

Further, because the brake pedal unit 40 generates brake fluid pressure by making strokes of the first and second pistons 33, 34 by the brake pedal 43, the brake pedal unit 40 is able to share components with a conventional brake fluid pressure generation device (the master cylinder) except the air cylinder 44 that is used instead of stepping force of the driver. Moreover, since the brake pedal 43 is housed in the front-side storage chamber 5, it is possible to have a wide space for the vehicle cabin 4.

Other Embodiment

An applicable embodiment of present disclosure is not limited to the embodiment above, and is carried out in various forms without departing from its spirit or main features.

In the embodiment, the brake pedal unit 40 is pneumatically actuated. However, an applicable embodiment of the present disclosure is not limited to this, and the brake pedal unit 40 may be hydraulically actuated as long as brake fluid pressure is generated by strokes of the first and second pistons 33, 34.

As described so far, the foregoing embodiment is just an example in every aspect, and should not be narrowly interpreted. Further, all deformations and changes that belong to the scope of the claims or its equivalent scope fall within the scope of the present disclosure.

According to the present disclosure, it is possible to realize a parking brake that generates high retaining force with a simple configuration. Therefore, the present disclosure is extremely advantageous when it is applied to a braking system provided in a vehicle in which automated driving is enabled.

What is claimed is:

1. A braking system in a vehicle in which automated driving is enabled, the braking system comprising a plurality of brake fluid pressure generation devices that are provided in a storage chamber divided from a vehicle cabin, each of the brake fluid pressure generation devices being configured to generate brake fluid pressure, wherein:
the brake fluid pressure generation devices are provided on the same fluid pressure transmission route on which the brake fluid pressure is transmitted, and include a non-electrically actuated brake fluid pressure generation device and an electrically actuated brake fluid pressure generation device; and
the braking system further includes:
an emergency stop brake operating unit that is provided inside the vehicle cabin and is configured to actuate the brake fluid pressure generation devices independently from the automated driving;
a brake circuit configured to generate braking force with use of the brake fluid pressure from the non-electrically actuated brake fluid pressure generation device in a non-energized state or in a case of transition to the non-energized state after the emergency stop brake operating unit is operated;
a cylinder housing;
a first piston and a second piston which are configured to slide inside of the cylinder housing,
wherein the electrically actuated brake fluid pressure generation device is configured to generate the brake fluid pressure using the cylinder housing and strokes of the first and second pistons based on a signal from a brake electronic control unit (ECU), and
wherein the non-electrically actuated brake fluid pressure generation device is configured to generate the brake fluid pressure using the cylinder housing and strokes of the first and second pistons based on an input piston configured to slide inside of the cylinder housing and included in non-electrically actuated brake fluid pressure generation device.

2. The braking system according to claim 1, wherein the brake circuit is configured so that an external power source is connected with the brake circuit, and in the non-energized state, the brake circuit is configured to release braking force generated by the non-electrically actuated brake fluid pressure generation device, the brake circuit being provided with an external power source connector.

3. The braking system according to claim 1, wherein:
the non-electrically actuated brake fluid pressure generation device includes an air cylinder, and a brake pedal stored in the storage chamber, the air cylinder being configured to be actuated as the emergency stop brake operating unit is operated, and the brake pedal being configured to be rotated by the air cylinder and to push the input piston to produce the stroke of the first and second pistons.

4. The braking system according to claim 1, wherein the electrically actuated brake fluid pressure generation device comprises an electric motor configured to maintain the hydraulic fluid at a predetermined pressure.

5. The braking system according to claim 1, wherein the non-electrically actuated brake fluid pressure generation device comprises a brake pedal connected to the input piston.

6. The braking system according to claim 1, wherein the first and second pistons are further configured to:
generate the brake fluid pressure in the electrically actuated brake fluid pressure generation device by sliding in the cylinder housing based on the hydraulic fluid maintained at the predetermined pressure by the electric motor; and
generate brake fluid pressure in the non-electrically actuated brake fluid pressure generation device by sliding the input piston in the cylinder housing by rotating the brake pedal.

7. A braking system in a vehicle in which automated driving is enabled, the braking system comprising a plurality of brake fluid pressure generation devices that are provided in a storage chamber divided from a vehicle cabin, each of the brake fluid pressure generation devices being configured to generate brake fluid pressure, wherein:
the brake fluid pressure generation devices are provided on the same fluid pressure transmission route on which the brake fluid pressure is transmitted, and include a non-electrically actuated brake fluid pressure generation device; and
the braking system includes:
an emergency stop brake operating unit that is provided inside the vehicle cabin and is configured to actuate the brake fluid pressure generation devices independently from the automated driving; and
a brake circuit configured to generate braking force with use of the brake fluid pressure from the non-electrically actuated brake fluid pressure generation device in a non-energized state or in a case of transition to the non-energized state after the emergency stop brake operating unit is operated, wherein the brake circuit is configured so that an external power source is connected with the brake circuit, and in the non-energized state, the brake circuit is configured to release braking force generated by the non-electrically actuated brake fluid pressure generation device, the brake circuit being provided with an external power source connector, and wherein:

the brake circuit is configured so that a solenoid and an internal power source are electrically connected with each other in series, the solenoid being configured to prohibit actuation of the non-electrically actuated brake fluid pressure generation device when a current flows by closing a valve connected to an air cylinder configured to rotate a brake pedal included in the non-electrically actuated brake fluid pressure generation device;

as the emergency stop brake operating unit is operated, the emergency stop brake operating unit cuts off the current between the solenoid and the internal power source; and the external power source connector is a junction box that is electrically connected with the solenoid in parallel so that a current from the external power source is allowed to flow in the solenoid.

* * * * *